United States Patent
Bhagavatula et al.

[19]

[11] Patent Number: 6,137,456
[45] Date of Patent: Oct. 24, 2000

[54] ELECTRONIC DISPLAY DEVICE FOR SIMULTANEOUSLY DISPLAYING 2D AND 3D IMAGES

[75] Inventors: Venkata A. Bhagavatula, Big Flats; Robert L. Carlson, Horseheads; Robert G. Lindquist, Elmira, all of N.Y.

[73] Assignee: Corning Incorporated, Corning, N.Y.

[21] Appl. No.: 09/243,328

[22] Filed: Feb. 3, 1999

Related U.S. Application Data

[63] Continuation-in-part of application No. 08/869,273, Jun. 4, 1997, abandoned.
[60] Provisional application No. 60/020,939, Jul. 1, 1996, and provisional application No. 60/073,706, Feb. 4, 1998.

[51] Int. Cl.[7] .................................................. G09G 5/00
[52] U.S. Cl. .................. 345/7; 345/6; 345/9; 345/32; 345/43; 345/103; 345/109
[58] Field of Search ............................... 345/7, 9, 32, 43, 345/102, 103, 105, 109, 113, 214, 215, 6; 348/51; 359/462

[56] References Cited

U.S. PATENT DOCUMENTS

| | | | |
|---|---|---|---|
| 3,863,246 | 1/1975 | Trcka et al. | 345/102 |
| 4,294,524 | 10/1981 | Stolov | 353/84 |
| 4,478,495 | 10/1984 | Samek | 359/254 |
| 4,717,949 | 1/1988 | Eichenlaub | 348/54 |
| 4,753,517 | 6/1988 | Samek | 359/254 |
| 4,829,365 | 5/1989 | Eichenlaub | 348/54 |
| 5,007,718 | 4/1991 | Minoura et al. | 359/265 |
| 5,036,385 | 7/1991 | Eichenlaub | 348/59 |
| 5,040,878 | 8/1991 | Eichenlaub | 349/62 |
| 5,048,933 | 9/1991 | Asano | 349/61 |
| 5,293,534 | 3/1994 | Mihara | 349/100 |
| 5,315,377 | 5/1994 | Isono et al. | 348/51 |
| 5,410,345 | 4/1995 | Eichenlaub | 348/59 |
| 5,428,366 | 6/1995 | Eichenlaub | 345/102 |
| 5,457,574 | 10/1995 | Eichenlaub | 359/619 |
| 5,500,765 | 3/1996 | Eichenlaub | 359/463 |
| 5,506,597 | 4/1996 | Thompson et al. | 345/85 |
| 5,508,716 | 4/1996 | Prince et al. | 345/103 |
| 5,528,402 | 6/1996 | Parker | 349/139 |
| 5,606,455 | 2/1997 | Eichenlaub | 359/463 |
| 5,886,675 | 3/1999 | Aye et al. | 345/7 |
| 5,897,184 | 4/1999 | Eichenlaub et al. | 349/64 |

FOREIGN PATENT DOCUMENTS

| | | |
|---|---|---|
| 3-119889 | 10/1989 | Japan . |
| 7-236164 | 9/1995 | Japan . |

OTHER PUBLICATIONS

J. Eichenlaub and A. Martens, "3D without glasses", Mar. 1992, pp. 9–12.

*Primary Examiner*—Richard A. Hjerpe
*Assistant Examiner*—Henry N. Tran
*Attorney, Agent, or Firm*—Maurice M. Klee

[57] ABSTRACT

A flat screen autostereoscopic display for bright wide angle stereoscopic images employs a flat screen on which are displayed a light pattern such as a plurality of regularly spaced, thin, vertical light emitting lines. The light lines are formed through use of electrically switchable materials such as liquid crystal or electrochromic materials. A transmissive electronic display, e.g., a liquid crystal display, is located in front of the light lines. The display and light lines are arranged in such a way that an observer sees the light emitting lines through one set of pixels with the left eye and the same lines through a different set of pixels through the right eye. Methods and apparatus for the simultaneous formation of a two-dimensional image and a three-dimensional image on such a transmissive electronic display, and for moving or dragging the display area of the three-dimensional image from one location to another on said display, are also disclosed.

16 Claims, 10 Drawing Sheets

6,137,456

ELECTRONIC DISPLAY DEVICE FOR SIMULTANEOUSLY DISPLAYING 2D AND 3D IMAGES

CROSS REFERENCE TO RELATED APPLICATIONS

This application is a continuation-in-part of U.S. application Ser. No. 08/869,273, filed Jun. 4, 1997 now abandoned, which claims the benefit under 35 USC §119(e) of U.S. Provisional Application No. 60/020,939, filed Jul. 1, 1996.

This application claims the benefit under 35 USC §119(e) of U.S. Provisional Application No. 60/073,706, filed Feb. 4, 1998.

The contents of U.S. application Ser. Nos. 08/869,273, 60/020,939, and 60/073,706 are hereby incorporated herein by reference in their entireties.

FIELD OF THE INVENTION

This invention relates to autostereoscopic displays and, in particular, to backlights for such displays including backlights which allow for the simultaneous display of 2D and 3D images.

BACKGROUND OF THE INVENTION

A number of techniques have been considered for displaying three dimensional (3D) imaging using video transmission. For non-holographic techniques, this requires projecting different (stereoscopic) images to the left and right eyes. Many of these techniques require the use of special glasses to project the two images to the two eyes. Recently, techniques that don't require the use of the special glasses have been developed. One approach developed by Dimension Technologies, Inc. (DTI), a company located in Rochester, N.Y., involves the use of parallax illumination. This approach is discussed in detail in "3D Without Glasses", by I. Eichenland and A. Morris, Information Display 3/92, Pages 9–12. This article describes one such display device in which an ordinary monochrome or color liquid-crystal display (LCD) is located in front of the viewer. The LCD is a two-dimensional array of individually controllable elements (pixels) arranged in rows and columns, typically 640 columns and 480 rows in an 8×6-in. active area. It is illuminated from behind, and the amount of light transmitted by the individual pixels can be controlled so that images with a range of gray shades can be displayed.

To generate 3-D images, the LCD displays the left and right halves of a stereopair on alternate columns of pixels at a rate of 30 frames per second, the standard rate of NTSC television. For example, the left image appears on the odd columns, and the right image appears on the even columns. Thus, each complete stereoscopic image consists of 320 columns and 480 rows.

In this display, both halves of a stereopair are displayed simultaneously through the use of a special illumination plate located behind the LCD, which optically generates a lattice of 320 very thin, very bright uniformly spaced vertical light lines. The lines are spaced with respect to the pixel columns, and because of the parallax, the left eye sees all of these lines through the odd columns of the LCD, while the right eye sees them through and even columns. Such structures are further explained, for example, in U.S. Pat. Nos. 5,457,574, 4,829,365, 4,717,949, 5,036,385, 5,040,878, 5,410,345 and 5,500,765, the specifications of which are all hereby incorporated by reference.

Although numerous modifications to the basic structure described above are disclosed in these references to provide greater image resolution, multiple viewing zones, and improved "look-around" capability, the displays disclosed in these references are either entirely three-dimensional or two-dimensional at any given time. However, in many applications, it would be desirable to be able to display two-dimensional and three-dimensional images on the display simultaneously. Further, it would also be desirable to be able to more (i.e., drag) and/or enlarge or diminish the display area for such 3D images on the display.

Additionally, in such displays, there is a fixed relation between the distance between the LCD and the illumination plate and the viewing distance (display to viewer) that determines (in part)the dimensions of the "viewing zones". These viewing zones are the regions in front of the display where the observer can perceive 3D images. Consequently, if the position of the viewer's head is not at an appropriate location with respect to the screen and the light line, the eyes do not see different images and the 3D effect will be gone.

Different head tracking devices have been employed to track head movement and solve this problem. For example, U.S. Pat. No. 5,457,574, describes employing multiple lamp illumination systems which are used to allow a smooth stereoscopic image tracking as the head of the observer move laterally (see for example FIG. 7A, 7B of this patent). A similar scheme can be used to implement a "look around" feature in which the observer would be able to see different perspectives of the object as he moves his head. This is achieved by timing appropriate stroboscopic lamps.

Present implementations of parallax illumination concepts are bulky with a large number of lamps or moving elements for head tracking that require precise alignment. Because of this, the size becomes unwieldy, and the reliability of the display suffers.

SUMMARY OF THE INVENTION

The present invention addresses the above needs and provides an electronic display device capable of displaying two dimensional images and autostereoscopic 3D images simultaneously on different portions of the display, or two dimensional or three dimensional images over the entire display surface. Additionally, the invention provides a display capable of permitting enlargement or diminishment of the size of the display area for a 3D image, as well as movement of the 3D image display area from one location to another on the display. Further, the invention provides a convenient mechanism by which to track head movement.

Accordingly, one aspect of the present invention relates to devices for selectively transmitting light through a transmissive information display in such a manner that the entire display may provide an image in two dimensions or three dimensions, or portions of the display may provide a two dimensional image while other portions provide a three dimensional image simultaneously. In one embodiment, these devices have a light source for emitting light, and a light blocking module for selectively blocking the light from said light source delivered to the transmissive information display. One such light blocking module comprises a material having a light transmissivity that is electronically switchable by applying an electric potential thereto, such as, for example, a liquid crystal or electrochromic material.

For example, the electronically switchable material may be sandwiched between a pair of substrates having aligned transparent electrodes thereon, such that by application of an electric potential to the electrodes, the switchable material disposed between the electrodes can be selectively switched to prevent the light from passing through that portion of the module. Thus, by arranging one of the electrodes in a pattern of parallel spaced electrode lines, and placing on the other substrate an electrode that covers the entire surface across from the first electrode, upon applying an electric potential to the electrodes, light will be blocked at the location of the electrodes but pass through the spaces between the electrodes and generate light lines that will be transmitted to the corresponding portion of the information display. Such light lines can be used to generate a 3D image in that portion of the display in the manner disclosed in U.S. Pat. Nos. 4,717,949, 5,036,385 and 5,510,345. In portions of the module where there are no electrodes, or where there is no electric potential applied across the electrodes, the light passes through to the information display to provide a two dimensional image capability in such portions of the display.

In one such embodiment, at least two electrode patterns of parallel spaced electrode lines may be provided on one of the substrates, the electrode lines of one pattern interdigitated with the electrode lines of the other pattern, with the electrode lines of each pattern connected to an independent busbar for each electrode pattern, said busbars being capable of independent electronic activation to enable formation of parallel light lines in different locations on said light blocking module. By activating different electrodes at different times, this embodiment can be used to enable head tracking, i.e., different electrodes can be activated according to where the viewer is located. Further, sequential activation of the electrodes in synchronization with image refreshment on the display may be used to provide enhanced resolution as disclosed in U.S. Pat. No. 5,036,385.

The light emitting devices of the present invention result in a number of advantages over the prior art. For example, the light emitting devices of the present invention, which employ electronically switchable materials with various electrode patterns, permit the simultaneous display of 2D and 3D images on different portions of the display. Further, depending on the specific electrode patterns utilized, the light emitting devices of the invention may permit movement or size alteration of the display area for a 3D image, or be capable of performing head tracking functions simply by switching on and off the appropriate electrode configurations.

Consequently, the light pattern emitting devices of the present invention can be used to implement a head tracking system similar to that disclosed in U.S. Pat. No. 5,457,574. However, the present invention can enable this result more easily with multiple electrode patterns, thereby eliminating the need for hard to control and bulky stroboscopic lamps. In a similar way, multiple electrode patterns can be used to simplify the head tracking of multiple observers by replacing the multiple lamps discussed in the prior art.

DETAILED DESCRIPTION OF THE DRAWINGS

The present invention describes various approaches to fabricate a compact backlighting system that, together with parallax illumination, can be used to form a 3D image. In the present invention, the DTI autostereoscopic display concept is employed, with exception that the present invention utilizes novel concepts for forming the backlighting in such a way that 2D and 3D images can be displayed simultaneously and areas of the display displaying the 3D images can be enlarged or moved from one location to another.

In one approach, an electronically switchable material is provided between appropriate electrode patterns to fabricate backlight blocking assemblies. The electronically switchable material can be, for example, an electrochromic or liquid crystal material (e.g. nematic or polymer dispersed). Of course, electrochromic or polymer dispersed liquid crystal may or may not employ polarizer/analyzer combinations, as desired or necessary. By applying an electric potential between the two electrodes, the electronically switchable material can be made to selectively permit transmission or blockage of the light emitted from the source of the backlight through the LC material and continuing through to the liquid crystal display (LCD) panel.

Figure 1:
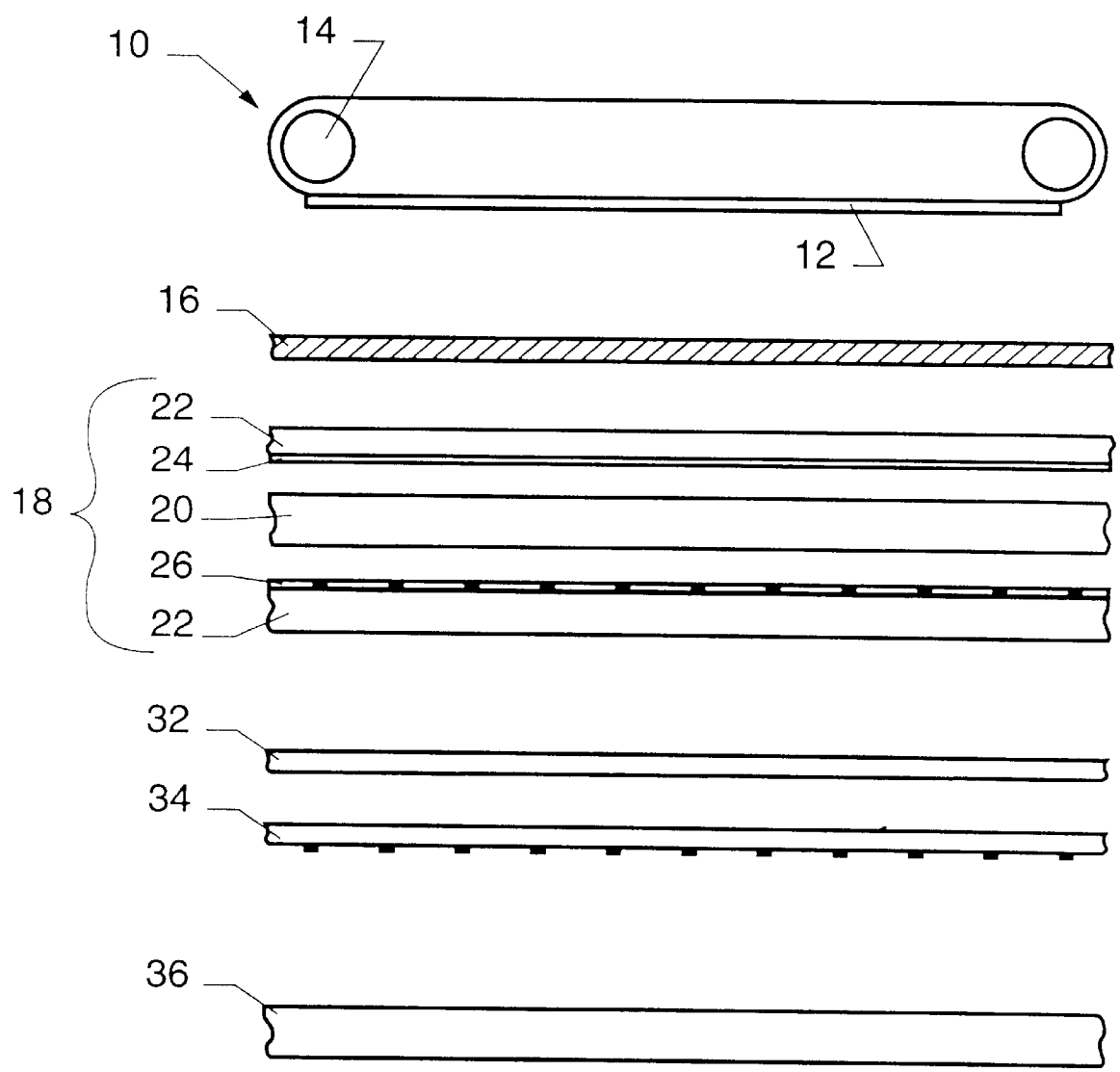
FIG. 1 illustrates a 2D/3D display in accordance with the present invention.

FIG. 1 illustrates a 2D/3D display system in accordance with the invention. Light source 10 consists of a scattering surface 12 and a pair of lamps 14 located on each side of the scattering surface 12. The light radiation is emitted from the lamps 14, through the scattering surface 12, and then through polarizer 16. The light then travels through the light blocking module 18 in accordance with the present invention, and then through the analyzer 32 (a second polarizer) and the LCD 36.

Figure 2:
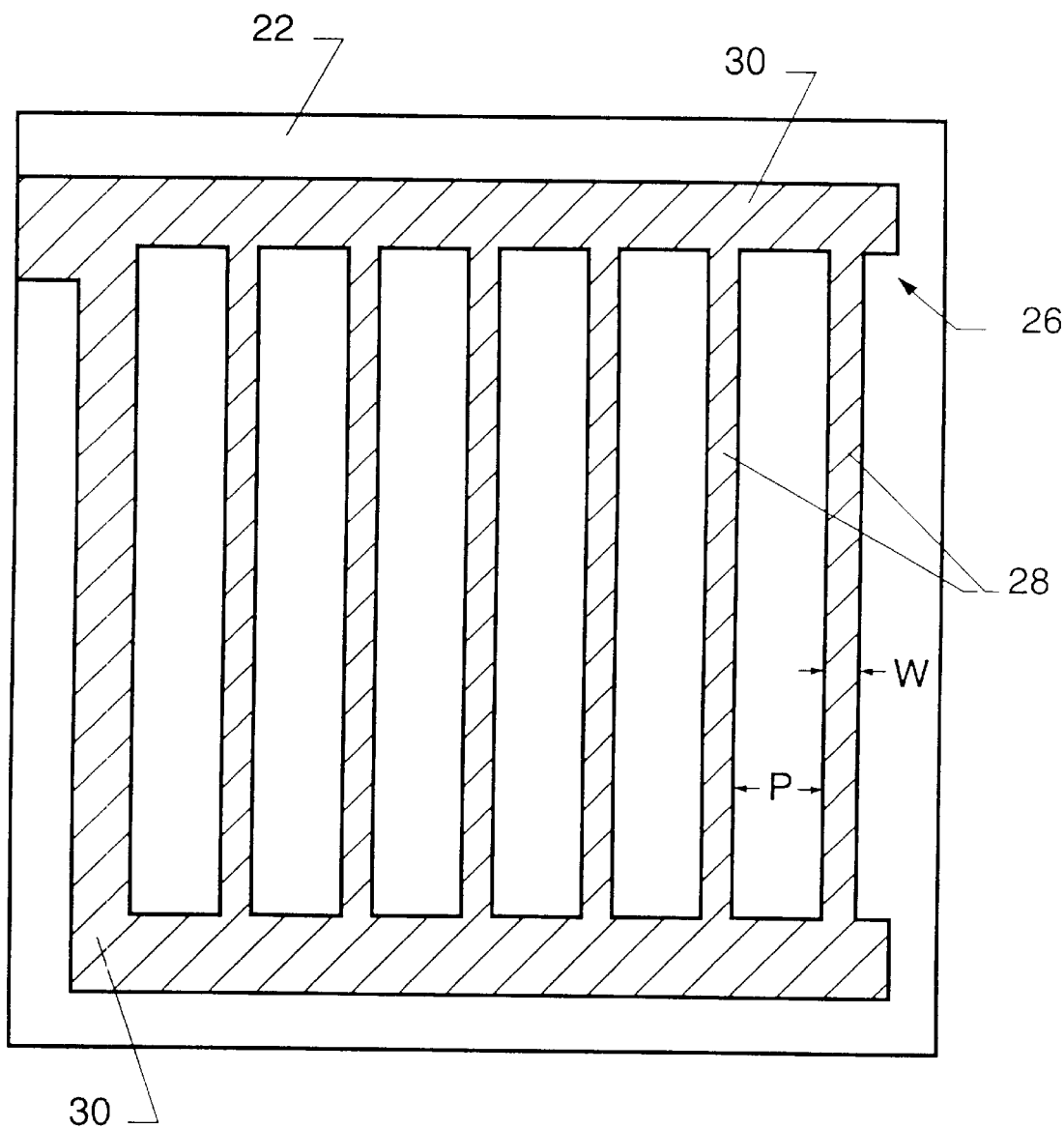
FIG. 2 illustrates an electrode configuration for use in the light blocking modules of the present invention.

In this embodiment of the present invention, light blocking module 18 comprises an electrically switchable material 20 which is selectively switchable to thereby allow selective transmission of the light emanating from light source 10 through the light blocking module 18. The switchable material may be, for example, a liquid crystal material or an electrochromic material. In FIG. 1, light blocking module 18 consists of two glass pattern plates 22 having a liquid-crystal material sandwiched therebetween. A transparent indium tin oxide (ITO) ground electrode 24 is deposited on the inside surface of one of the glass plates, and a selectively deposited transparent tin oxide electrode pattern 26 is deposited on the inner surface of the other glass plate 22, so that the two electrodes sandwich the liquid-crystal material 20. In FIG. 1, the selectively deposited tin oxide electrode pattern 26 is in the form of a plurality of parallel electrodes 28 which connect to a bus bar 30, as illustrated in FIG. 2. The electrodes 28 illustrated in FIG. 2 have a width w and are separated by a pitch p.

Referring again to FIG. 1, by applying an electric potential between the electrode pattern 26 and the ITO ground electrode 24, the liquid-crystal material 20 will become aligned in the areas corresponding to the electrodes 28. The light is selectively blocked by the blocking module 18, so that only selective portions are emitted therefrom. This light then continues through analyzer 32 and a shadow mask 34 (if either of these is necessary or desired) after which it passes through liquid crystal display 36. FIG. 1 illustrates the use of a "positive mode" liquid crystal material. In positive mode, the polarizer and analyzer are in crossed relationship (i.e., oriented at ninety degree angles). The light is polarized by passing through polarizer 16. If no voltage is applied to the liquid crystal (via the electrodes) the standard nematic liquid crystal material will rotate the direction of the polarized light ninety degrees, thus aligning it for transmittal through the analyzer 32, which is also oriented ninety degrees to the polarizer. Consequently, without any voltage applied to a blocking module which is operating in positive mode, no light is blocked by the blocking module, but rather a uniform light is transmitted from the light source 10 through the blocking module and into the LCD. Such light would be desirable for two dimensional display.

When voltage is applied to the panel, the liquid crystal material aligns in the areas corresponding to the electrode line locations, and consequently this light is not rotated for transmittal through the analyzer. As a result, no light is transmitted from the blocking module in areas corresponding to the electrode line pattern. In this way, light lines are formed in the areas where the light was allowed to pass through the liquid crystal material 20. These light lines are used to illuminate the liquid-crystal display, and form the light lines necessary for operation of the autostereoscopic display discussed above. With proper design of the width and pitch of these electrode lines, a series of light lines of required width and pitch for the 3D display are transmitted. Selection of the correct width and pitch to enable 3D display is discussed, for example, in U.S. Pat. No. 4,717,949.

Figure 3:
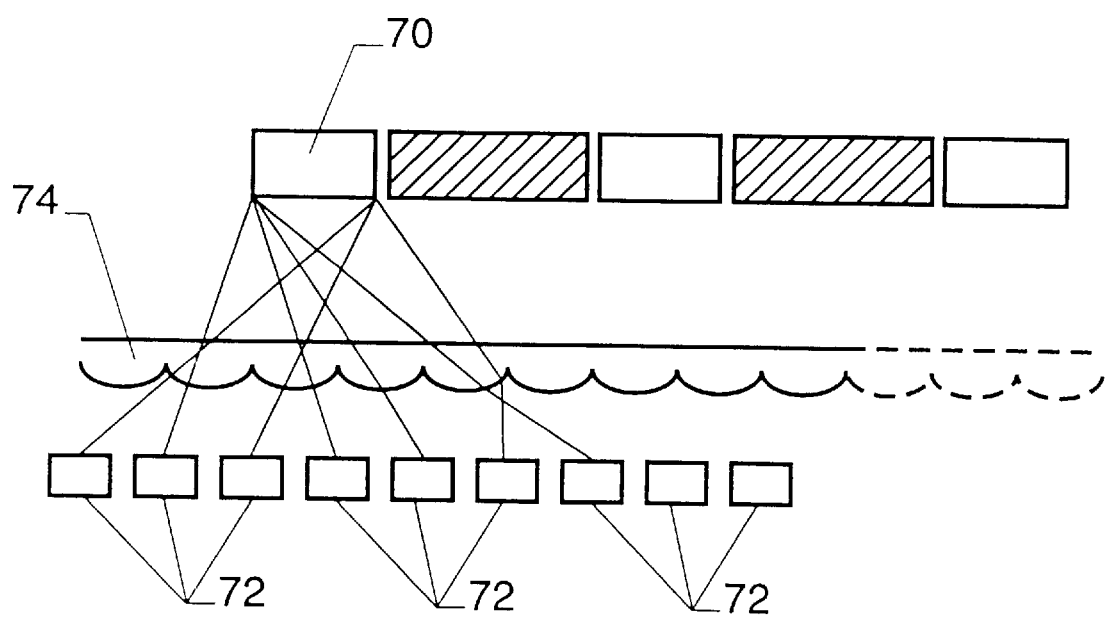
FIG. 3 illustrates an embodiment of the invention using a lenticular lens to multiply light lines transmitted to the electronic display.

Additionally, a lenticular or fly's eye lens may be placed between the light blocking module and the display to modify the light reaching the display as is known in the art. More particularly, a lenticular or fly's eye lens may be inserted between the light blocking module and the image display to reduce the resolution requirement of the module. For example, as shown in FIG. 3, by using a lenticular lens 74, each light line 70 emitted from the blocking module can be used to illuminate a number of columns 72 of the image display.

By putting a "shadow mask" glass plate 34 with opaque and clear spaces of proper dimension as shown in FIG. 1, and controlling the thickness of the plate, the divergence of the light lines can be controlled. If head tracking and 2D/3D illumination changes are not needed, simple 3D illumination can be obtained simply by employing a shadow mask or other similar device capable of selective light blocking, and positioning this device to selectively block light emitted from a backlighting source, thereby forming light lines.

Figure 4:
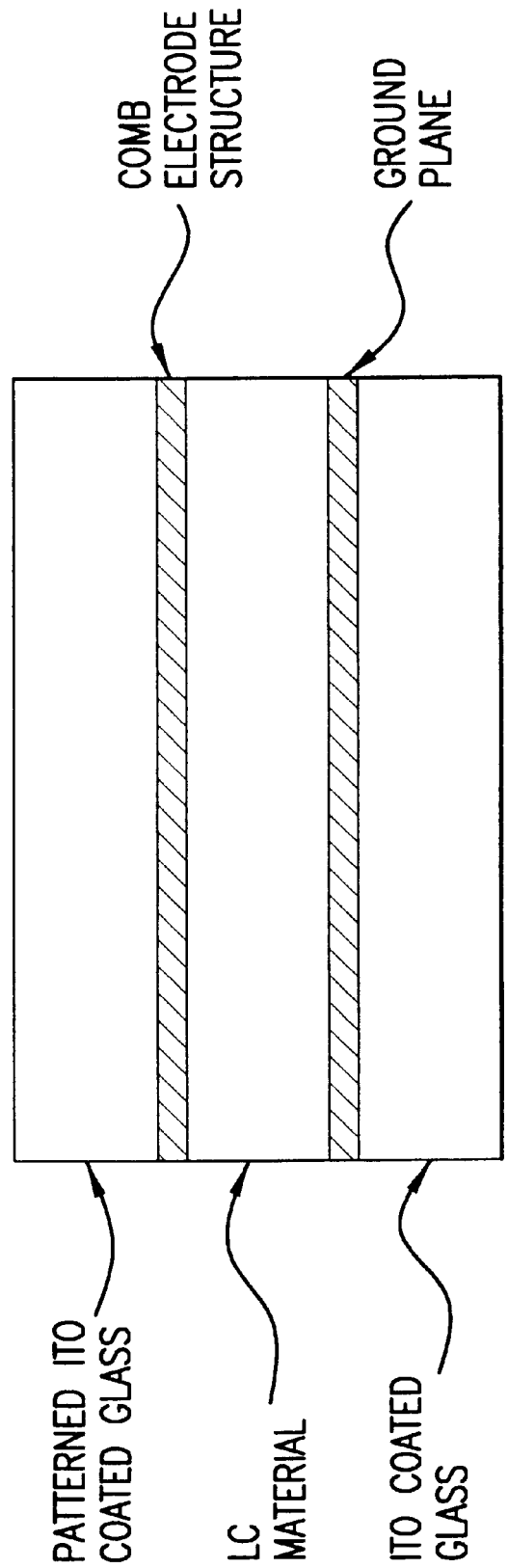
FIG. 4 is a schematic cross-sectional view through a light blocking module constructed in accordance with the invention.
Figure 5B:
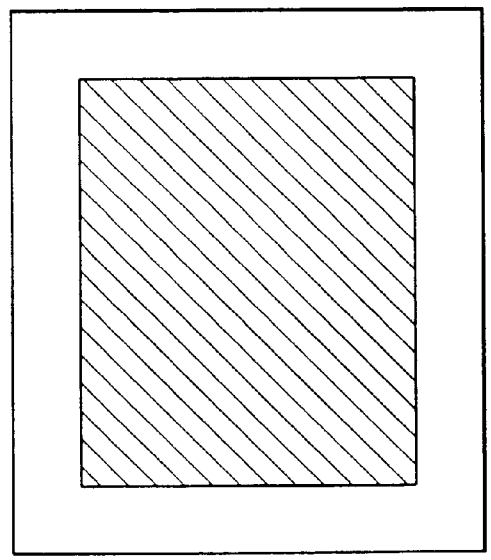
FIG. 5b is a schematic plan view of the ground plane of FIG. 4.
Figure 5A:
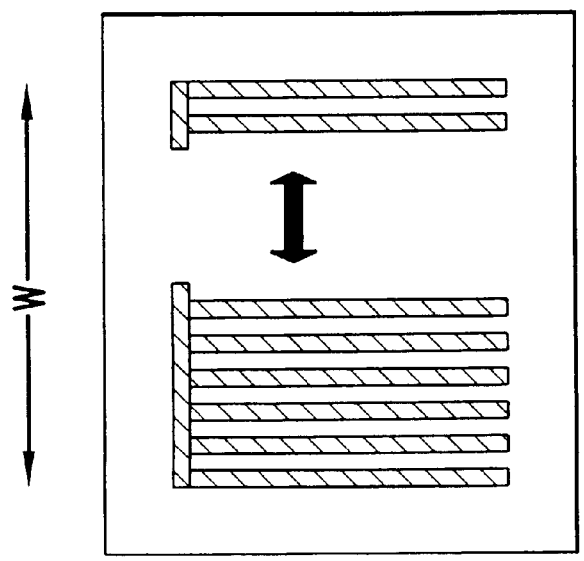
FIG. 5a is a schematic plan view of the combed electrode of FIG. 4.

The basic structure of the light blocking module of the preceding embodiments is schematically illustrated in FIGS. 4 and 5, where the transparent comb electrode structure and ground plane (typically made of indium tin oxide, as discussed above) are shown in FIG. 4. The comb electrode structure of FIG. 5a is patterned in a lattice of very thin lines and the ground plane of FIG. 5b is not patterned. When the comb structure is not activated, a uniform plane of light is allowed to pass through the LC element to illuminate the transmissive electronic display, e.g., a high pixel count AMLCD, producing a high resolution 2D image. When the comb structure is activated, a series of thin uniform bright lines are generated. These "light" line provide the requisite backlighting to view 3D autostereoscopic images at half resolution on the AMLCD.

Figure 6:
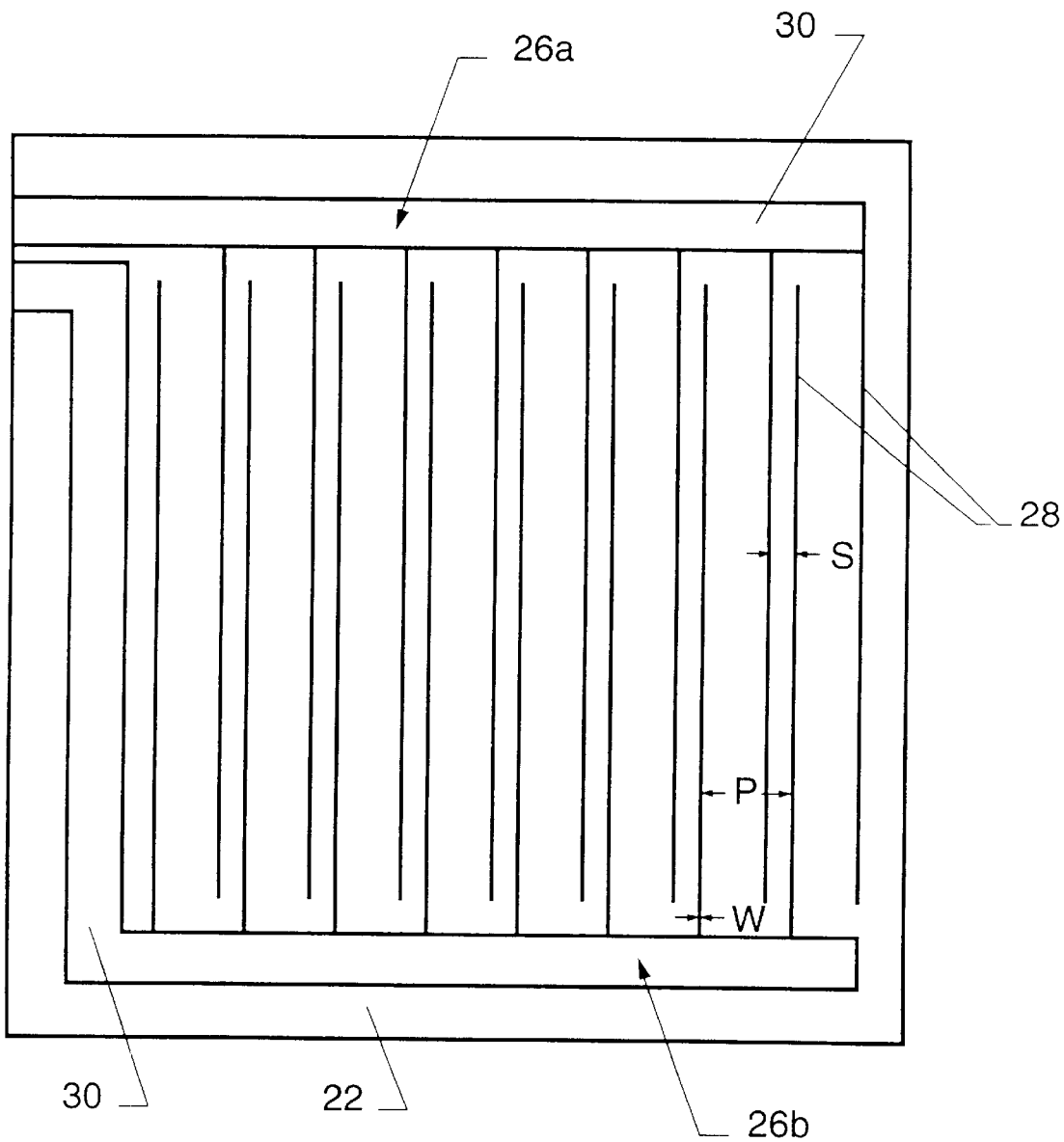
FIG. 6 illustrates an alternative electrode design in accordance with the invention.

An alternative electrode pattern to those of FIGS. 2 and 5a is shown in FIG. 6. This pattern has two sets of electrode line patterns 26a and 26b, each of which is interdigitized with respect to one another. By applying voltage to the second set of electrode line patterns 26b, a set of light lines is generated which is located laterally from the first set. By providing each of the two sets of interdigitized electrodes with the same width and pitch electrode lines 28, one or the other of the electrodes could be utilized to form respective light lines which are laterally shifted from one another a distance S, thereby enabling head tracking. For example, given a particular head location where a particular electrode pattern is used to form light lines, movement of the head could be sensed by attaching a sensor target to the viewer's head and sensing location of the target through a sensor tracking means, so that as the head is moving in relation to the liquid crystal display, the given set of light lines is turned off and the next set of light lines necessary for 3D display is turned on when necessary. Thus, by having various parallel sets of line electrode patterns, precise head tracking is possible without having to use mechanical means to move the light line producing device. Additionally, by sequentially activating the electrode patterns at a rate greater than the fusion frequency of vision, the resolution of the resulting images can be enhanced as described in U.S. Pat. No. 5,036,385.

Figure 7:
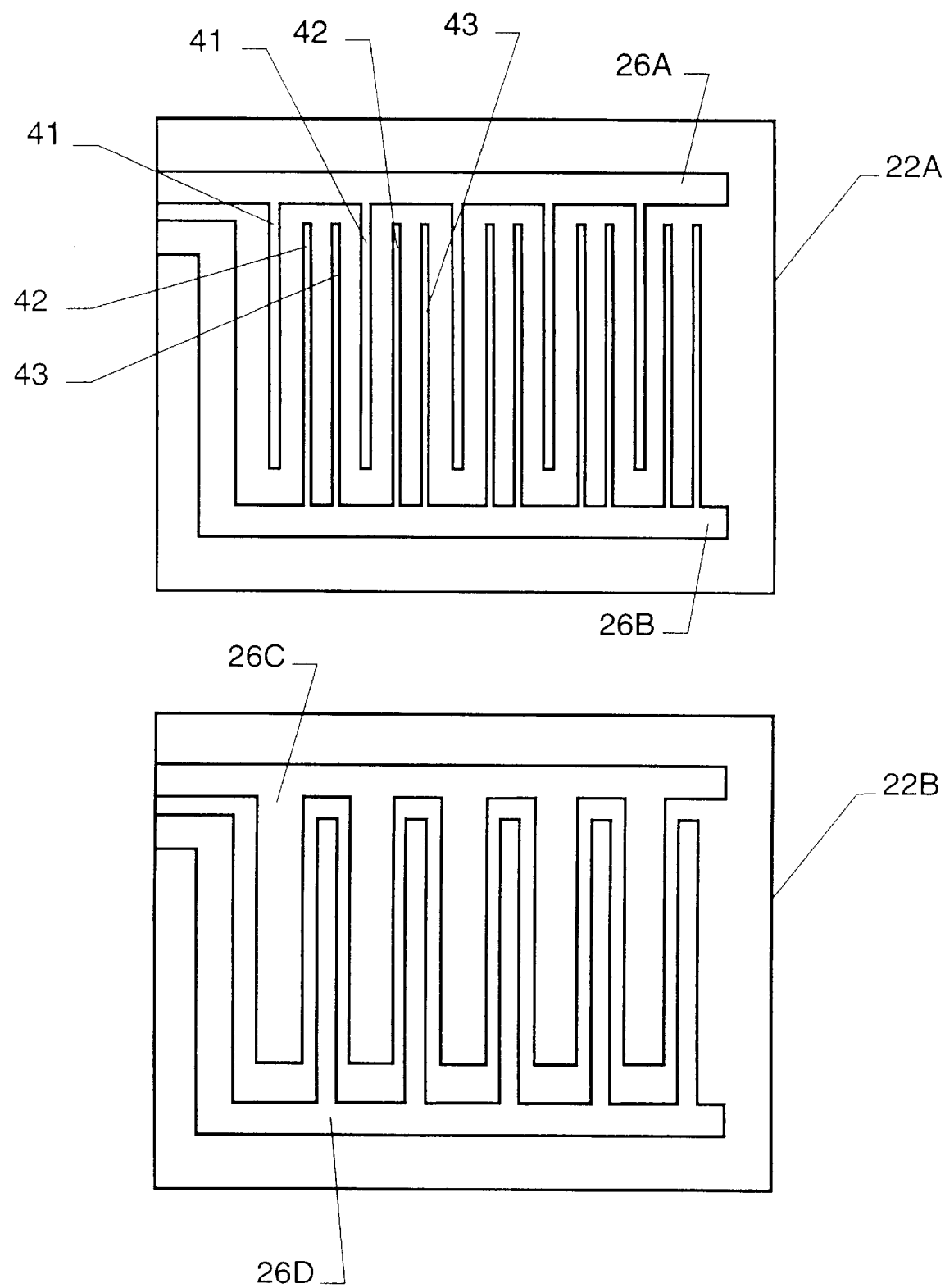
FIG. 7 illustrates another alternative electrode design in accordance with the invention.

While FIG. 6 illustrates only two sets of interdigitized electrodes, more than two sets of interdigitized electrodes could also be employed. If needed, electrodes could also be overlaid on top of each other by utilizing insulating layers between electrode line patterns. Thus, as the number of electrode patterns 26 are increased above two, more complicated designs utilizing insulating "crossovers" may be needed. One approach for three electrodes sets without crossovers can be achieved by having one pair of electrode patterns 26 on glass sheet 22A and a second pair of electrode patterns 26 on the opposite glass sheet 22B as shown in FIG. 7. Each of the electrode patterns 26A and 26B on sheet 22A comprises a plurality of electrode lines having a uniform pitch, each pattern 26A and 26B being relatively uniformly interdigitated with respect to one another. The third and fourth electrode patterns 26C and 26D are located on glass sheet 22B. Electrode pattern 26C comprises electrode lines having a wider width than the other electrode patterns, so that, in effect, the wide electrode lines of pattern 26C align with two adjacent electrode lines 41 and 42 from electrode pattern 26A and 26B, respectively. Consequently, when the voltage is applied between the 26A and 26C electrode patterns, the electric field is applied only in the area corresponding to electrode lines 41. When the voltage is applied between the 26B and 26C electrode patterns, the electric field is applied only in the area corresponding to electrode lines 42. When the voltage is applied between the 26B and 26D electrode patterns, the electric field is applied only in the area corresponding to electrode lines 43.

Further, the use of two or more pairs of interdigitized sets of electrodes may be used to provide multiple 3D viewing zones in a manner similar to the procedure described in U.S. Pat. No. 5,410,345. Here, each pair of interdigitized electrode sets can be used to create a separate 3D perspective image viewable in a different viewing zone. However, to avoid creating a flickering image, all image scannings are preferably completed within $\frac{1}{30}^{th}$ of a second. Accordingly, if two 3D perspectives are to be generated, each perspective is preferably finished within $\frac{1}{60}^{th}$ of a second, i.e. each eye view is preferably flashed within $\frac{1}{120}^{th}$ of a second for a full resolution 3D image in two separate zones.

As the skilled artisan will recognize, use of the above electrode patterns permits the development of a 3D image only at the display locations corresponding to the locations on the light blocking module bearing the electrode patterns. Accordingly, it may often be desirable to include multiple electrodes or electrode sets of varying size and at varying locations on the light blocking module to provide 3D image "windows" of varying sizes at various display locations.

Figure 9:
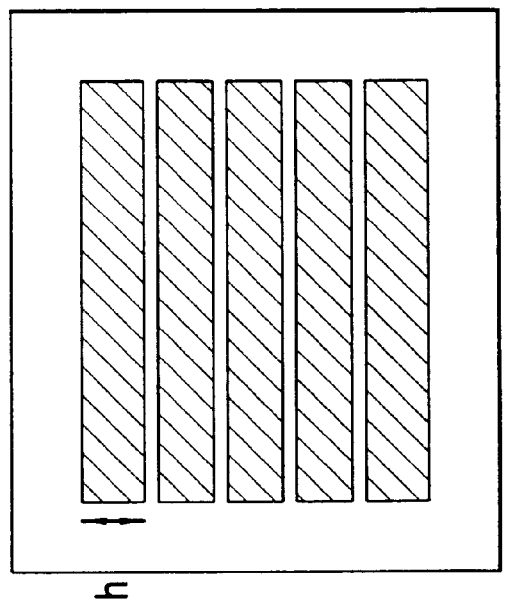
FIG. 9 is a schematic plan view of a horizontally segmented ground plane for use in certain "windowed" embodiments of the invention.
Figure 8:
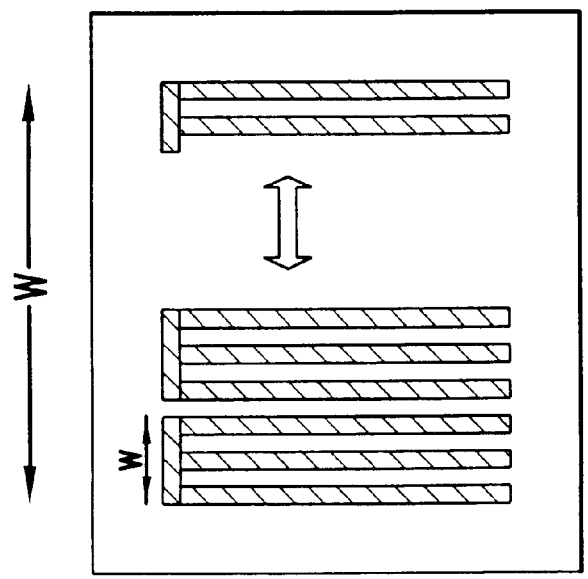
FIG. 8 is a schematic plan view of a vertically segmented combed electrode for use in certain "windowed" embodiments of the invention.

One such embodiment is shown in FIGS. 8 and 9. The basic structure of the device involves three parts: vertical segmentation of the comb electrode, horizontal segmentation of the ground plane, and passive matrix addressing of the devices. The vertical segmentation of the comb structure is shown in FIG. 8 in which the thin lines are group into N columns. The horizontal segmentation of the ground plane is shown in FIG. 9 where the ground plane is cut into M rows. The resolution of 3D windowing and dragging is given as w=W/N by h=H/M in which W and H are the width and height of the display screen, respectively. Using passive matrix addressing, only M+N connections are needed to drive any combination of cells in the grid, where the slow response and threshold effects of the LC material are used to turn on any segment. Many methods exist with various LC materials and passive matrix addressing schemes to improve multiplexing, contrast ratio, and brightness. Since gray scales, video rates and high resolution are either not needed or not as critical in this backlighting device, passive addressing offers significant cost advantages.

For a standard 15 inch diagonal LC panel, high-end 3D windowing with a resolution of 1 mm by 1 mm would require only 270 rows of 540 connections yielding 72,900 segments which is well within passive multiplexing capabilities. The low-end 3D windowing with a 1 in. by 1 in. windowing resolution of 100 segments requires 20 connections with an electronics cost comparably to an LC watch. The resolution of the windowing would be directly related to the electronics cost.

Figure 10:
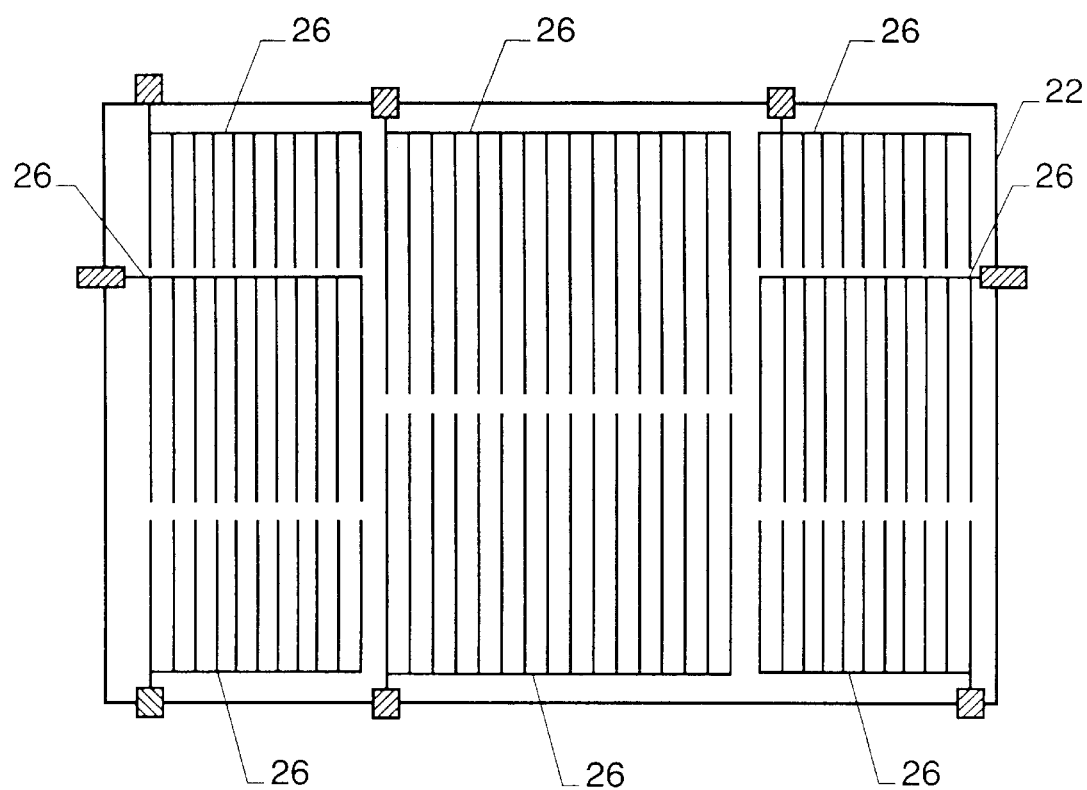
FIG. 10 illustrates a multiple window electrode configuration in accordance with the invention.

A further "windowed" embodiment is shown in FIG. 10, wherein substrate 22 of light blocking module 18 bears eight electrode patterns 26 at various locations on the transmissive surface of the module. In a particularly preferred variation of this configuration, the surface of light blocking module is divided into a grid or checkerboard pattern of discrete areas, with each area having its own electrode set. Such a configuration provides for the generation of 3D images over the entire display, or any incremental portion thereof corresponding to the number of grid areas on the light blocking module activated. Due to the ability to selectively generate light lines across the surface of the module, the display area or windows for displaying 3D images may be moved, i.e., "dragged," around the display or altered in size by appropriate manipulation of the light passing through the blocking module in concert with the image manipulations on the display.

In operation, the electronic display devices of the present invention provide a method for the simultaneous display of 2D and 3D images. According to this method, the images to be displayed are imparted to the display screen and the light transmitted to the display for its illumination is adjusted from a uniform light source, via a light blocking module, to create a pattern of light lines corresponding to the regions of the 3D image, and areas of uniform light corresponding to the regions containing the 2D images. Adjustment of the light transmitted to the display into lines suitable for 3D image formation occurs by generating an electrical potential across selected portions of the liquid crystal light blocking module to prevent light transmission through the liquid crystal module in such areas.

While the display systems described above utilize cross polarizers, and are thus designed to operate in "positive" mode, the invention is not limited to such variations. Instead, the panel could also be designed to operate in "negative" mode i.e., with polarizers in parallel. In this case, without voltage, no light is transmitted and with voltage application, light lines (3D illumination) are generated in areas corresponding to the location of the electrode lines. To get 2D illumination in this case, all of the liquid crystal material would have to be activated.

In addition to conventional twisted nematic liquid crystals, the light blocking modules of the invention may use cholesteric liquid crystals which are capable of working off of reflected ambient light in combination with reflective displays without need of fluorescent lighting. As no fluorescent lights are required, energy consumption is low which is advantageous in portable devices. However, if operation in very dark environments is needed, such modules may also be operated in transmissive mode with fluorescent lights.

Figure 11:
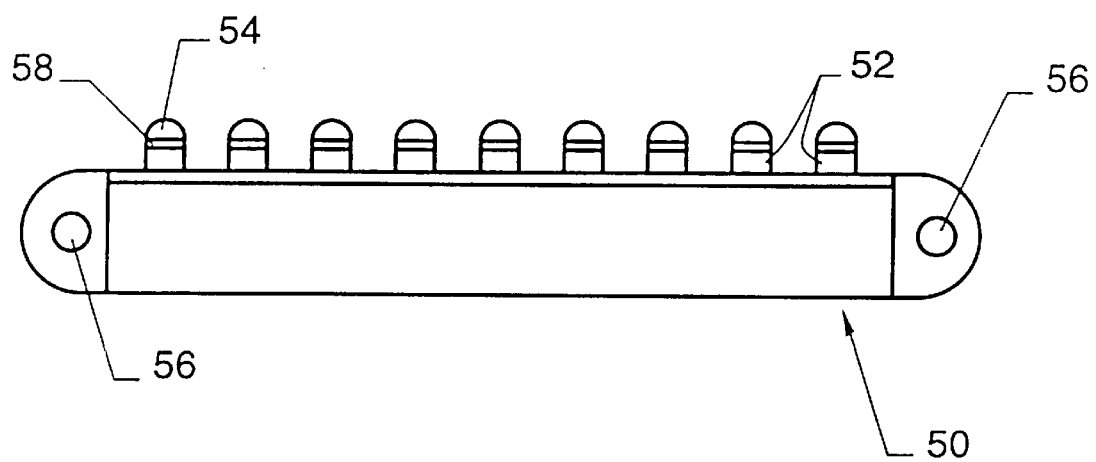
FIG. 11 illustrates use of light emitting waveguide devices in accordance with the present invention.

Another approach for obtaining 2D/3D illumination is to use waveguiding principles to generate the light lines. FIG. 11 illustrates a side view of such an embodiment, in which a backlight 50 is provided with a pattern of parallel rows of a material 52 having a high index of refraction. The pattern of parallel rows will function to provide light lines, similar to the parallel electrodes discussed above. The thickness of the deposit material 52 may depend on the aspect ratio of the lines employed. Typically, the waveguide lines should have the same width and pitch as the electrode lines discussed above. For example, in one embodiment the width of the high index material lines is 38–50 microns, with an aspect ratio of approximately 1. The high index material is deposited onto a substrate 54 which has a smooth surface. The substrate glass 54 may be conventional float glass. By "high index" material, it is meant that this material 52 has an index of refraction that is higher than that of the substrate 54 upon which it is deposited. By employing light sources 56 along the sides and underneath the substrate 54 and high index material 52, light emitted from the light sources 56 will be refracted into and through the pattern of high index material 52. Consequently, by depositing the high index material 52 in discrete parallel lines similar to the electrode lines described above, light lines are formed by light being redirected through the high index material lines 52.

If desired, further layers could be added to improve performance of the waveguided light. For example, a scattering layer 58 could deposited on the high index material 52 if desired, to widen the angle of viewing. The scattering layer 58 would be comprised, for example, of a material suitable for scattering light, such as a porous glass layer or an epoxy filled with $SiO_2$ or $TiO_2$ particles. In addition or alternatively, a lensing layer 54 may be provided on top of the scattering layer 52 to focus the emitted light. The radius of the lens 54 will depend on the divergent angles needed in the display. For example, a radius of approximately 3–4 times the width of the high index lines 50 would provide a divergent angle of approximately 20–30 degrees (which is generally considered to be a desirable viewing angle), thus providing a viewing angle of 20–30 degrees.

The high index material should be higher than the substrate glass utilized in the backlight. For example, as the typical substrate glass has an index of about 1.5, in such cases an index of 1.8 or higher would be sufficient for the high index material 50. The high index material can be organic or inorganic (e.g., silicon nitride or oxynitride). Because of the higher index of this film, light in the substrate plate would refract out wherever the high index lines are present. The refracted angle can be controlled by the indices of the high index lines and that of substrate. In addition, scattering centers can be created on top of the high index lines to scatter the light over a wider angle if necessary. Also cylindrical lenses can be formed on these high index light for additional control on the divergence angles.

One embodiment of the invention is further illustrated by the following example, which is meant to be illustrative, and not in any way limited, to the claimed invention.

EXAMPLE

A 7"×7" back light panel for 2D/3D illumination was assembled in accordance with the design illustrated in FIG. 1. In order to test the head tracking concept, the two electrode set illustrated in FIG. 6 was utilized, the two electrode patterns being shifted laterally from each other by 76 microns. Using lithographic deposition techniques, indium tin oxide (ITO) electrode lines 38 microns wide with a 191.3 micron pitch were formed on a substrate to form the two electrode patterns. An ITO ground electrode was formed on the opposite substrate. The LC panel was tested with nematic type LC under negative mode.

The light lines generated with this prototype exhibited good contrast and width and pitch control, with good uniformity of light line intensity.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. An electronic display unit for producing an image which appears three dimensional to a viewer, said display unit having a vertical direction and a horizontal direction with respect to the viewer during use and comprising:

(A) a light source for emitting light;

(B) a light blocking module for selectively blocking the light emitted from the light source so as to be able to form first and second pluralities of vertical light lines, said light blocking module being on a viewer side of the light source during use of the display unit and comprising:

(i) a first substrate;
(ii) a second substrate;
(iii) a material having a light transmissivity which is electronically switchable by applying an electric potential thereto, said material being sandwiched between the first and second substrates;
(iv) a first electrode adjacent to the first substrate; and
(v) a second electrode adjacent to the second substrate; and (C) a transmissive electronic display having individual picture elements capable of generating an image when illuminated, said transmissive electronic display being on a viewer side of the light blocking module during use of the display unit;

wherein:

(1) the first electrode comprises:
(a) a first plurality of vertical electrode lines;
(b) a first busbar electrically connected to said first plurality of vertical electrode lines;
(c) a second plurality of vertical electrode lines displaced from the first plurality of vertical electrode lines; and
(d) a second busbar electrically connected to the second plurality of vertical electrode lines, the electric potential of said second busbar being selectable independent of the electric potential of the first busbar;

(2) through the selection of a first electric potential between the first busbar and at least a portion of the second electrode, the light transmissivity of the material can be switched to form the first plurality of vertical light lines;

(3) through the selection of a second electric potential between the second busbar and at least a portion of the second electrode, the light transmissivity of the material can be switched to form the second plurality of vertical light lines displaced from the first plurality of vertical light lines; and (4) the second plurality of vertical electrode lines is not interdigitated with the first plurality of vertical electrode lines so that, the electronic display unit produces an image which has a portion which appears three dimensional to the viewer and a portion which appears two dimensional by selection of said first and second electric potentials.

2. The electronic display unit of claim 1 wherein the vertical electrode lines have widths and are separated by spaces and wherein the vertical light lines are aligned with the widths.

3. The electronic display unit of claim 1 wherein the vertical electrode lines have widths and are separated by spaces and wherein the vertical light lines are aligned with the spaces.

4. The electronic display unit of claim 1 wherein the second plurality of vertical electrode lines is horizontally displaced from the first plurality of vertical electrode lines.

5. The electronic display unit of claim 1 wherein the second plurality of vertical electrode lines is vertically displaced from the first plurality of vertical electrode lines.

6. The electronic display unit of claim 1 wherein the second plurality of vertical electrode lines is both vertically and horizontally displaced from the first plurality of vertical electrode lines.

7. The electronic display unit of claim 1 wherein the second electrode comprises a plurality of horizontally oriented sub-electrodes whose electric potentials with respect to the first and second busbars can be independently selected.

8. The electronic display unit of claim 1 wherein the first electronic is farther from the viewer than the second electrode during use of the display unit.

9. The electronic display unit of claim 1 wherein the second electrode is farther from the viewer than the first electrode during use of the display unit.

10. The electronic display unit of claim 1 wherein the switchable material is selected from the group consisting of a liquid crystal material and an electrochromic material.

11. An electronic display unit for producing an image which appears three dimensional to a viewer, said display unit having a vertical direction and a horizontal direction with respect to the viewer during use and comprising:

(A) a light source for emitting light;

(B) a light blocking module for selectively blocking the light emitted from the light source so as to be able to form first, second, third, and fourth pluralities of vertical light lines, said light blocking module being on a viewer side of the light source during use of the display unit and comprising:
  (i) a first substrate;
  (ii) a second substrate;
  (iii) a material having a light transmissivity which is electronically switchable by applying an electric potential thereto, said material being sandwiched between the first and second substrates;
  (iv) a first electrode adjacent to the first substrate; and
  (v) a second electrode adjacent to the second substrate; and (C) a transmissive electronic display having individual picture elements capable of generating an image when illuminated, said transmissive electronic display being on a viewer side of the light blocking module during use of the display unit;

wherein:
  (1) the first electrode comprises:
    (a) a first plurality of vertical electrode lines;
    (b) a first busbar electrically connected to said first plurality of vertical electrode lines;
    (c) a second plurality of vertical electrode lines displaced from the first plurality of vertical electrode lines;
    (d) a second busbar electrically connected to the second plurality of vertical electrode lines,
    (e) a third plurality of vertical electrode lines displaced from the first plurality of vertical electrode lines;
    (f) a third busbar electrically connected to the third plurality of vertical electrode lines;
    (g) a fourth plurality of vertical electrode lines displaced from the first plurality of vertical electrode lines; and
    (h) a fourth busbar electrically connected to the fourth plurality of vertical electrode lines;
  (2) through the selection of a first electric potential between the first busbar and at least a portion of the second electrode, the light transmissivity of the can be switched to form the first plurality of vertical light lines;
  (3) through the selection of a second electric potential between the second busbar and at least a portion of the second electrode, the light transmissivity of the material can be switched to form the second plurality of vertical light lines displaced from the first plurality of vertical light lines;
  (4) through the selection of a third electric potential between the third busbar and at least a portion of the second electrode, the light transmissivity of the material can be switched to form the third plurality of vertical light lines displaced from the first plurality of vertical light lines;
  (5) through the selection of a fourth electric potential between the fourth busbar and at least a portion of the second electrode, the light transmissivity of the material can be switched to form the fourth plurality of vertical light lines displaced from the first plurality of vertical light lines;
  (6) the second plurality of vertical electrode lines is horizontally, but not vertically, displaced from the first plurality of vertical electrode lines;
  (7) the third plurality of vertical electrode lines is vertically, but not horizontally, displaced from the first plurality of vertical electrode lines;
  (8) the fourth plurality of vertical electrode lines is vertically and horizontally displaced from the first plurality of vertical electrode lines;
  (9) the electric potential of each of the first, second, third, and fourth busbars is independently selectable; and
  (10) none of the first, second, third, and fourth plurality of vertical electrode lines is interdigitated so that the electronic display unit produces an image which has a portion which appears three dimensional to the viewer and a portion which appears two dimensional by selection of said first, second, third, and fourth electric potentials.

12. The electronic display unit of claim 11 wherein the vertical electrode lines have widths and are separated by spaces and wherein the vertical light lines are aligned with the widths.

13. The electronic display unit of claim 11 wherein the vertical electrode lines have widths and are separated by spaces and wherein the vertical light lines are aligned with the spaces.

14. The electronic display unit of claim 11 wherein the first electrode is farther from the viewer than the second electrode during use of the display unit.

15. The electronic display unit of claim 11 wherein the second electrode is farther from the viewer than the first electrode during use of the display unit.

16. The electronic display unit of claim 11 wherein the switchable material is selected from the group consisting of a liquid crystal material and an electrochromic material.

* * * * *